April 20, 1926.
F. E. HOLMES ET AL
UNIVERSAL JOINT
Filed Nov. 5, 1923   2 Sheets-Sheet 1
1,581,802
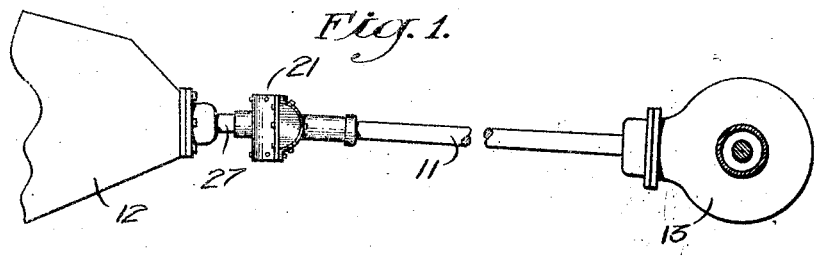
Fig. 1.
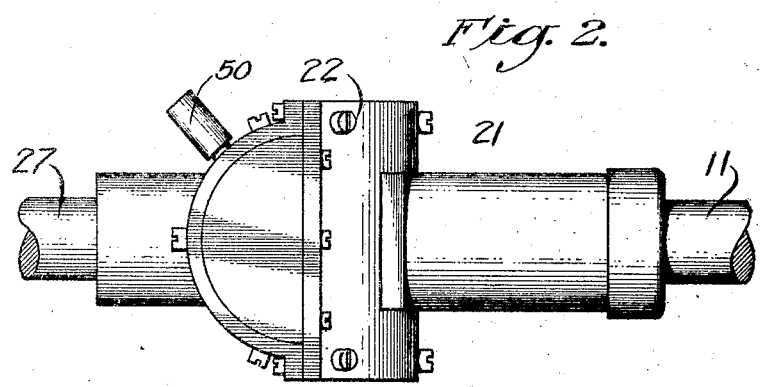
Fig. 2.
Fig. 3.
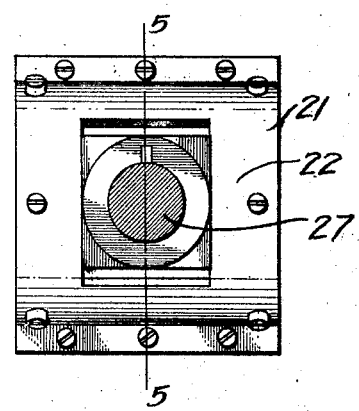
Fig. 4.
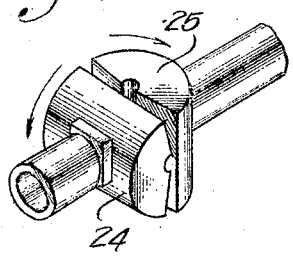
INVENTORS:
FRANK E. HOLMES,
RUSSELL C. BLOOMFIELD,
BY Graham + Davis
ATTORNEYS.

April 20, 1926.
F. E. HOLMES ET AL
UNIVERSAL JOINT
Filed Nov. 5, 1923
1,581,802
2 Sheets-Sheet 2
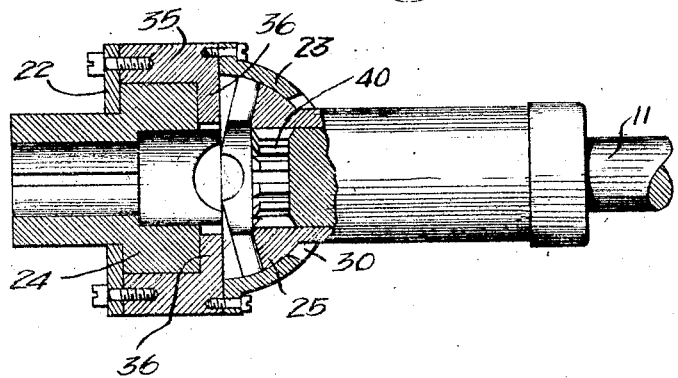
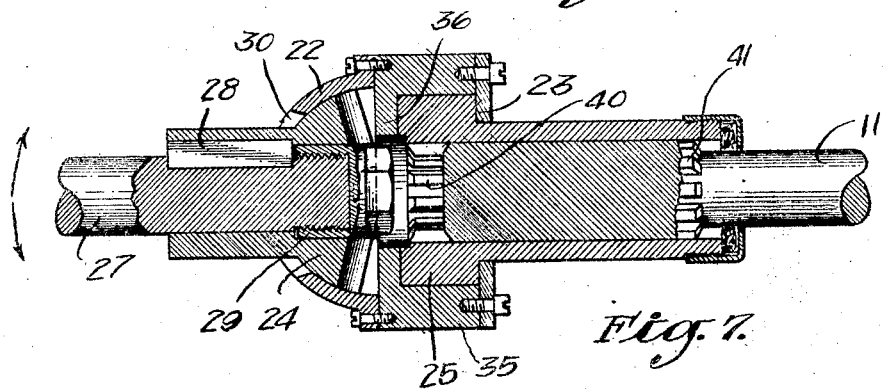
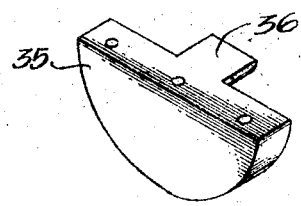
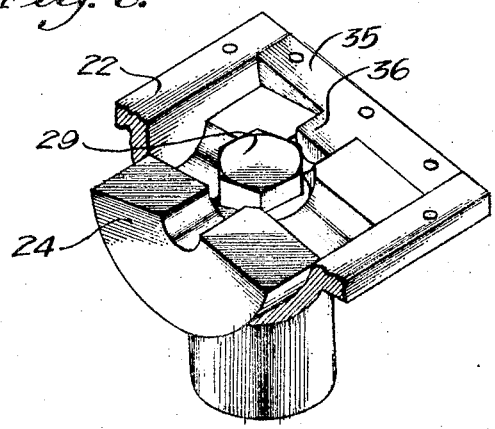
INVENTORS:
FRANK E. HOLMES,
RUSSELL C. BLOOMFIELD,
By Graham + Lewis
ATTORNEYS Patented Apr. 20, 1926.

1,581,802

UNITED STATES PATENT OFFICE.

FRANK E. HOLMES AND RUSSELL C. BLOOMFIELD, OF PASADENA, CALIFORNIA, ASSIGNORS TO FRANK E. HOLMES AND RUSSELL C. BLOOMFIELD, A COPARTNERSHIP CONSISTING OF SAID HOLMES AND SAID BLOOMFIELD.

UNIVERSAL JOINT.

Application filed November 5, 1923. Serial No. 672,812.

*To all whom it may concern:*

Be it known that we, FRANK E. HOLMES and RUSSELL C. BLOOMFIELD, both citizens of the United States, both residing at Pasadena, in the county of Los Angeles and State of California, have invented a new and useful Universal Joint, of which the following is a specification.

Our invention relates to the art of automobile construction and particularly to the mechanical connection between the engine and the rear wheels. In the standard form of automobile now in general use, an internal combustion engine is placed at the front end of the vehicle. Immediately back of the engine is a transmission mechanism, by which the gear ratio between the engine and the rear wheels may be varied. The transmission mechanism drives the rear wheels through a propeller shaft which extends back from the transmission mechanism and connects into a differential gear on the rear axle. The engine and transmission are usually rigidly secured to the frame of the automobile and the rear axle is mounted upon springs so that it has an up and down and to some extent a transverse movement with relation to this frame. It is, therefore, necessary to provide flexibility between the transmission and the differential, and this is commonly accomplished by means of a universal joint incorporated in the propeller shaft.

It is an object of our invention to provide a universal joint which is particularly applicable to this use.

It is a further object of our invention to provide a universal joint which shall be substantial in its construction and in which special provision shall be made for lubrication.

It is a further object of our invention to provide a universal joint having large bearing surfaces so that the wear thereof shall be very small.

It is a still further object of our invention to provide a universal joint which may be readily machined.

Referring to the drawings which are for illustrative purposes only,

Fig. 1 is a side elevation of a portion of an automobile equipped with our invention.

Fig. 2 is a side elevation on an enlarged scale of the universal joint.

Fig. 3 is an end view of same.

Fig. 4 is an isometric view of certain elements of the invention.

Fig. 5 is a section on a plane represented by the line 5—5 of Fig. 3.

Fig. 6 is a section at right angles to the section of Fig. 5.

Fig. 7 is a perspective view of an element of our invention.

Fig. 8 is a perspective view of certain elements partly broken away to show the internal construction.

In the form of the invention illustrated in these drawings we provide a propeller shaft 11 which connects a transmission mechanism 12 mounted on the frame of the automobile with a differential gear mechanism 13 mounted on the rear axle thereof. Carried in and forming part of the propeller shaft 11 is a universal joint 21 which embodies the invention. The universal joint consists of two housing members 22 and 23, these housings having semi-cylindrical cavities formed therein, the two housings being secured together in such a manner that the axes of the semi-cylindrical cavities lie at right angles to each other on a plane at the intersection of the two housings. Mounted in the cavities are two blocks, one being hereinafter called a driving block 24 and the other a driven block 25. These blocks have the form shown in Fig. 8, being of the same length as the cavities in which they fit, and having a cylindrical outer surface which, however, extends through something less than 180 degrees. The driving block 24 is driven by a shaft 27 extending out of the transmission mechanism 12, this shaft 27 being secured in the block 24 by means of a key 28 and a nut 29, as best shown in Fig. 6. An extension of the block 24 extends through an opening 30 in the housing 22, thus allowing the block 24 to be turned about its own axis through a limited distance to provide flexibility in the universal joint. Mounted in either end of the housing 22 are trunnion blocks 35, which are provided with trunnions 36. These trunnions 36 extend into semi-cylindrical cavities in the blocks 24 and 25 and hold these blocks in their proper relationship at all times. The block 25 has an opening 40 therethrough which is provided with a plurality of splines 41 which engage similar splines on the propeller shaft 11, which extends back to the differential 13. This arrangement allows for longitudinal play between the shaft 11 and the block 25. Means 50 are provided by which grease may be injected into the interior of the casing 22 and 23, this grease serving to lubricate the joint and preventing wear. It will be noted that both the blocks 24 and 25 have a limited movement about their axes, these axes being at right angles to each other. The joint, therefore, has a perfect flexibility as will be readily seen by inspecting Fig. 4. The interior of the joint being kept full of hard grease, lubrication is perfect and the wear is reduced to a minimum. The joint is very strong and will carry loads in excess of the torsional strength of the shaft 11.

We claim as our invention:

1. A universal joint comprising: a housing having two hemi-cylindrical cavities therein, the axes of these two cavities being in planes at right angles to each other; two blocks, one fitting in one of said cavities and the other in the other of said cavities, said blocks having the same length as said cavities but being less than semi-cylinders; four semi-cylindrical projections, two extending into one of said cavities concentric with its axis and at each side thereof, and two extending into the other of said cavities concentric with its axis and at each side thereof, each pair fitting into a groove in one of said blocks; means for attaching a driving member to one of said blocks; and means for attaching a driven member to the other of said blocks.

2. A universal joint comprising: a housing having two hemi-cylindrical cavities therein, the axes of these two cavities being in planes at right angles to each other; two blocks, one fitting in one of said cavities and the other in the other of said cavities, said blocks having the same length as said cavities but being less than semi-cylinders; four semi-cylindrical projections, two extending into one of said cavities concentric with its axis and at each side thereof, and two extending into the other of said cavities concentric with its axis and at each side thereof, each pair fitting into a groove in one of said blocks; means for attaching a driving member to one of said blocks; and means for attaching a driven member to the other of said blocks, said driving and driven members projecting through elongated holes in said housing so that they can each be turned through a limited arc around one of said axes.

3. A universal joint comprising: a housing having two hemi-cylindrical cavities therein, the axes of these two cavities being in planes at right angles to each other; two blocks, one fitting in one of said cavities and the other in the other of said cavities, said blocks having the same length as said cavities but being less than semi-cylinders; four semi-cylindrical projections, two extending into one of said cavities concentric with its axis and at each side thereof, and two extending into the other of said cavities concentric with its axis and at each side thereof, each pair fitting into a groove in one of said blocks; a driving shaft, passing through an opening in said housing, and secured in one of said blocks with the axis of said driving shaft at right angles to the axis of the block in which said driving shaft is secured; and a driven shaft, passing through an opening in said housing and secured to the other of said blocks, with the axis of said driven shaft at right angles to the axis of the block in which said driven shaft is secured.

4. A universal joint comprising: a housing having two hemi-cylindrical cavities therein, the axes of these two cavities being in planes at right angles to each other, and said housing being split and detachably secured together on a plane passing through both of said axes; two blocks, one fitting in one of said cavities and the other in the other of said cavities, said blocks having the same length as said cavities but being less than semi-cylinders; four semi-cylindrical projections, two extending into one of said cavities concentric with its axis and at each side thereof, and two extending into the other of said cavities concentric with its axis and at each side thereof, each pair fitting into a groove in one of said blocks; means for attaching a driving member to one of said blocks; and means for attaching a driven member to the other of said blocks.

5. A universal joint comprising: a housing having two hemi-cylindrical cavities therein, the axes of these two cavities being in planes at right angles to each other, and said housing being split and detachably secured together on a plane passing through both of said axes; two blocks, one fitting in one of said cavities and the other in the other of said cavities, said blocks having the same length as said cavities but being less than semi-cylinders; four semi-cylindrical projections, two extending into one of said cavities concentric with its axis and at each side thereof, and two extending into the other of said cavities concentric with its axis and at each side thereof, each pair fitting into a groove in one of said blocks; means for attaching a driving member to one of said blocks; and means for attaching a driven member to the other of said blocks, said driving and driven members projecting through elongated holes in said housing so that they can each be turned through a limited arc around one of said axes.

6. A universal joint comprising: a housing having two hemi-cylindrical cavities therein, the axes of these two cavities being in planes at right angles to each other and said housing being split and detachably secured together on a plane passing through both of said axes; two blocks, one fitting in one of said cavities and the other in the other of said cavities; means for attaching a driving member to one of said blocks; means for attaching a driven member to the other of said blocks, said driving and driven members projecting through elongated holes in said housing so that they can each be turned through a limited arc around one of said axes; bearing means connected to one section of said housing for engaging one of said blocks; and separate bearing means connected to the other section of said housing engaging the other of said blocks.

7. A universal joint comprising: a housing having two hemi-cylindrical cavities therein, the axes of these two cavities being in planes at right angles to each other, and said housing being split and detachably secured together on a plane passing through both of said axes; two blocks, one fitting in one of said cavities, and the other in the other of said cavities; bearing means connected to one section of said housing for engaging one of said blocks; and separate bearing means connected to the other section of said housing engaging the other of said blocks; means for attaching a driving member to one of said blocks; means for attaching a driven member to the other of said blocks, said driving and driven members projecting through elongated holes in said housing so that they can be turned through a limited arc around one of said axes; and means for permitting longitudinal movement of said driven member relative to the blocks attached thereto.

In testimony whereof, we have hereunto set our hands at Los Angeles, California, this 27th day of October, 1923.

FRANK E. HOLMES.
RUSSELL C. BLOOMFIELD.